United States Patent [19]

Bhagavatula et al.

[11] Patent Number: 4,889,404
[45] Date of Patent: Dec. 26, 1989

[54] ASYMMETRICAL BIDIRECTIONAL TELECOMMUNICATION SYSTEM

[75] Inventors: Venkata A. Bhagavatula, Big Flats; David E. Charlton, Corning, both of N.Y.

[73] Assignee: Corning Incorporated, Corning, N.Y.

[21] Appl. No.: 259,723

[22] Filed: Oct. 19, 1988

Related U.S. Application Data

[63] Continuation-in-part of Ser. No. 94,504, Sep. 9, 1987, abandoned.

[51] Int. Cl.[4] .......................... G02B 6/22; G02B 6/36; H04B 9/00
[52] U.S. Cl. ..................... 350/96.16; 307/3; 455/610; 350/96.30
[58] Field of Search ............... 307/3, 4; 455/606, 607, 455/612, 617; 350/96.16, 96.29, 96.30, 96.31, 96.33

[56] References Cited

U.S. PATENT DOCUMENTS

| | | | |
|---|---|---|---|
| 4,204,745 | 5/1980 | Sakai et al. | 350/96.31 |
| 4,217,027 | 8/1980 | MacChesney et al. | 350/96.31 X |
| 4,372,647 | 2/1983 | Okahoto et al. | 350/96.34 X |
| 4,441,180 | 4/1984 | Schüssler | 370/4 X |
| 4,453,961 | 6/1984 | Berkey | 65/3.12 |
| 4,465,334 | 8/1984 | Siemsen et al. | 350/96.31 X |
| 4,486,212 | 12/1984 | Berkey | 65/2 |
| 4,557,553 | 12/1985 | McLandrich | 350/96.16 X |
| 4,705,350 | 11/1987 | Cheng | 350/96.16 |
| 4,715,679 | 12/1987 | Bhagavatula | 350/96.30 X |
| 4,736,359 | 4/1988 | Cohen et al. | 370/3 |

OTHER PUBLICATIONS

"Design Considerations of Dispersion Free Dual—Mode Optical Fibers", by Cvijetic et al., IEEE J. of Q. Elect., vol. QE-23, No. 5, May 1987, pp. 469–472.

"Deposition of Fluorine—Doped Silica Layers from a $SiCl/SiF/O_2$ Gas Mixture by the Plasma—CVD Method" by Kippers et al., J. of Electrochemical Soc. Solid State Science & Tech., vol. 125, No. 8, Aug. 1978, pp. 1298–1302.

"Propagation Characteristics of Double—Mode Fibers", by Cohen et al., Bell System Tech. Journal, vol. 59, No. 6, Jul.–Aug. 1980, pp. 1061–1072.

"Structural Optimization for Two—Mode Fiber Theory & Exp.", by Kituyama et al., IEEE J. Q. Electronics, vol. QE-17, No. 6, Jun. 1981, pp. 1057–1063.

Primary Examiner—William L. Sikes
Assistant Examiner—Akm E. Ullah
Attorney, Agent, or Firm—William J. Simmons, Jr.

[57] ABSTRACT

The present invention pertains to an asymmetrical bidirectional optical communication system of the type comprising a central station, a plurality of user stations, and a plurality of bidirectional optical transmission paths, one of which connects the central station and one of the user stations. The central station is provided with a laser for initiating in the optical transmission path the propagation at a wavelength in the 1100–1700 nm window of a single-mode signal. Each user station is provided with a light source which initiates in the optical transmission path the propagation at a wavelength in the 700–950 nm window of a few-mode signal. Each optical transmission path comprises an optical fiber having transmission characteristics such that the single-mode signal propagates with a total dispersion less than 5 ps/km-nm and the few mode signal propagates with a bandwidth greater than 1 GHz-km.

14 Claims, 4 Drawing Sheets

ASYMMETRICAL BIDIRECTIONAL TELECOMMUNICATION SYSTEM

CROSS-REFERENCE TO RELATED APPLICATION

This application is a continuation-in-part of said application Ser. No. 094,504 filed Sept. 9, 1987 now abandoned.

BACKGROUND OF THE INVENTION

The present invention relates to optical communication systems, and more particularly, to optical communication systems that are characterized by the propagation over a single optical fiber of bidirectional signals having different information capacity requirements.

The interconnection of two stations by a single optical fiber is desirable from the standpoint of cost and system simplicity. Such asymmetrical bidirectional signal propagation is employed in certain classes of optical systems including certain types of cable TV systems, data links, weapons systems and the like. In these systems the transmitted information requirements in the two directions of propagation are often dissimilar. The central station usually has the higher bandwidth requirements, but in some applications such as television security systems, the end station has higher bandwidth requirements. The lower speed path is frequently much lower in capacity than the high speed path. If information requirements are static, then many prior art bidirectional systems are available. However, such current systems fail to function if there are new requirements in the lower speed link caused by factors such as increasing user requirements or a need to improve the reliability or responsiveness of the link.

When optical signals are propagated bidirectionally over a single fiber, the transmitters at opposite ends of the fiber often differ in some respect such as wavelength or modulation format in order to avoid crosstalk between the transmitted and received signals. When silica-based optical fibers are employed, optical signals can be propagated at wavelengths in the low attenuation windows at 700-950 nm and 1.1-1.7 $\mu$m. Such systems are advantageous in that signals carried in light streams of 1300 nm or greater cannot be detected by devices used to receive light of shorter wavelengths. This reduces system cross talk and noise. Another design consideration for systems employing such fibers is the cost of the transmitter. Gallium arsenide devices, which operate in the shorter of the aforementioned wavelength regions, are less expensive than indium phosphide devices, which operate in the longer wavelength region.

A further design consideration for dual wavelength bidirectional systems is the cost, complexity and effectiveness of the wavelength division multiplexer (WDM) which connects the optical source and detector to each end of the optical fiber. In the single-mode duplex optical data transmission system disclosed in U.S. Pat. No. 4,557,553 (McLandrich) the wavelengths of the two sources are 800 nm and 850 nm. Since both transmitters operate in the 750-900 nm region, both can employ gallium arsenide, aluminum-gallium-arsenide sources. However, because of the small wavelength separation between the two sources, the system of the McLandrich patent must utilize relatively expensive WDM devices that employ evanescent field coupling to separate the two signals. Also, the McLandrich system cannot realize the aforementioned advantage of employing a detector that is sensitive to only one of the propagated wavelengths. Furthermore, it is desirable to operate the high capacity direction at a wavelength longer than the 700-950 nm window to which the McLandrich system is limited in order to obtain a better balance of the dynamic range which, inter alia, allows longer spans between repeaters.

Inexpensive wavelength division multiplexers can be employed if the wavelengths of the two transmitters are sufficiently separated, e.g. when the two transmitted wavelengths are in the two aforementioned low attenuation windows. However, the operation of conventional systems in such a bidirectional manner would cause certain problems and disadvantages. A fiber of the type taught in U.S. Pat. No. 4,715,679 is capable of providing low dispersion (less than 5 ps/km-nm) at wavelengths longer than about 1200 nm. If both transmitters operated in this wavelength range, both sources would be expensive. If one chooses an optical fiber that is designed to propagate a low dispersion single-mode signal at about 800 nm, to take advantage of the sources available at that wavelength, dispersion is very high at 1300 nm. Whereas dispersion may be a little lower at 1550 nm, the loss would be very high for that fiber at that wavelength due to the very low cutoff wavelength needed.

The source-to-fiber coupling efficiency can be enhanced in the systems under discussion by employing multimode fibers. However, the bandwidth of a conventional multimode fiber is relatively low since the group delays of modes are different. Such a system could not be upgraded because of the relatively low bandwidth of the multimode fiber. Conventional, commercially available silica-based single-mode optical fibers that are designed for operation at wavelengths beyond 1250 nm are capable of propagating two or more modes in the wavelength region between about 800 nm and 900 nm. However, such fibers exhibit a bandwidth less than 1 GHz-km (usually about 200-400 MHz-km) when operated in that few mode region.

Higher multimode bandwidth can be achieved by designing a fiber such that only a few modes propagate and such that the normalized delay times of the propagating modes coincide at or near the operating V-value $V_o$. Also, the difference between the normalized delay times of the propagating modes caused by V-value deviation from $V_o$ should be as small as possible. For example, U.S. Pat. No. 4,204,745 (Sakai et al) discloses a +graded index two-mode fiber wherein the refractive index profile is given by $$n(r) = \begin{cases} n_1[1 - 2\Delta(r/a)^\alpha]^{1/2} & 0 \leq r \leq a \\ n_0 = n_1[1 - 2\Delta]^{1/2} & r > a \end{cases} \quad (1)$$

where $n_1$ denotes the peak refractive index of the core, $n_0$ denotes the refractive index of the cladding, $\Delta$ is the relative index difference $(n_1^2 - n_0^2)/2n_1^2$, a is the core radius, and $\alpha$ is the index profile parameter. The fiber is designed such that the normalized frequency V is as large as possible, so long as V is less than the cut-off frequency of the second higher order mode $LP_{21}$). Thus, the fundamental mode $LP_{01}$) and the first higher order mode ($LP_{11}$) are propagated simultaneously. The refractive index distribution of the core is designed such that the group delay of the lowest order $LP_{01}$) mode coincides with that of the first higher order (LP$_{11}$) mode, the power exponent α preferably satisfying the inequality $$3.2 \leq \alpha \leq 6$$

Although fibers of the type disclosed in the Sakai et al. patent are capable of propagating two modes with low dispersion over a band of wavelengths, the low dispersion wavelength band is relatively narrow. Therefore, light sources having outputs within a narrow wavelength range must be employed. Since the spectral output of light sources varies with respect to temperature, the system is more sensitive to temperature change. Temperature effects can be compensated through active device thermal stabilization. However, this raises the cost of the light source module.

Fibers having α-values less than 3.2 have been proposed in the publication, K. Kitayama et al., IEEE Journal of Quantum Electronics, vol. QE-17, No. 6, June 1981, pp 1057–1063 and in the publication, L. G. Cohen et al., Bell System Technical Journal, vol. 59, No. 6, July-August 1980, pp. 1061–1072. Although the wavelength band of good mode equalization can be broadened by reducing α to a value below 3.2, this cannot be done without adversely affecting single-mode operation. When the α-value of a fiber is in the range defined by the Kitayama et al. and Cohen et al. publications, operation is substantially above the theoretical cutoff of the second higher order mode. If the second higher order mode is not totally eliminated, the system bandwidth will be degraded. This is especially troublesome in subscriber loop applications wherein relatively short lengths of fiber may connect the transmitter and receiver and wherein short lengths of fiber may extend between connectors. The second higher order mode can be re-excited at each connector. Also, if such a fiber is optimized for two mode operation, it will not exhibit low waveguide dispersion in the single-mode region.

The publication, M. M. Cvijetic et al., IEEE Journal of Quantum Electronics, vol. QE-23, No. 5, May 1987, pp. 469–472 describes a non α-profile fiber design for obtaining dispersion-free two-mode operation at 1.55 μm. Two-mode operation at 1.3 μm is described in the publication, M. M. Cvijetic, Optical and Quantum Electronics, vol. 16, 1984, pp 307–317. In accordance with the technique described in these publications, an attempt is made to minimize chromatic dispersion in the two-mode region of operation (either 1.55 μm or 1.3 μm). There is no attempt made in these publications to optimize dispersion properties of the fundamental mode in the single-mode region of operation. If an attempt were made to operate either of the two fibers of the Cvijetic publications in the single-mode region, waveguide dispersion would be so high that information carrying capacity of the fiber would be limited.

None of these prior art few mode fibers is capable of low dispersion operation in the single-mode region near the cutoff V-value of the first higher mode.

The single-mode/multimode fiber taught in U.S. Pat. No. 4,465,334 (Siemsen et al.) comprises an inner, single-mode fiber core having a stepped refractive index profile, and its cladding is the multimode light conducting zone. The diameter of the outer zone is much larger than that of the inner zone, whereby it propagates a multimode signal. An attempt to excite only the single-mode signal by confining the source light to the central zone would result in the propagation of a significant percentage of the input power in the outer, multimode part of the fiber. Similarly, an attempt to initiate the propagation of only a multimode signal would also result in the transmission of a single-mode signal in the central zone. In either case, bandwidth would be adversely affected due to the different propagation speeds of the single-mode and multimode signals.

SUMMARY OF THE INVENTION

It is therefore an object of the present invention to provide an asymmetrical bidirectional telecommunication system that is capable of propagating signals with a bandwidth of at least 1 GHz-km in both directions and which is capable of propagating signals with low dispersion in the high data rate direction.

Briefly, the present invention relates to an asymmetrical bidirectional optical communication system comprising first and second stations and bidirectional optical transmission means for transmitting optical signals between the stations. A first source of radiation is located at the first station for propagating at a wavelength $\lambda_2$ through the optical transmission means an information-carrying optical signal with a total dispersion less than 5 ps/km-nm. A second source of radiation is located at the second station for propagating at a wavelength $\lambda_1$ through the optical transmission means a few-mode optical signal with a bandwidth greater than 1 GHz-km, the second wavelength being shorter than the first wavelength.

The wavelength $\lambda_2$ of the first source may be such that optical energy from said first source initiates in the optical transmission means the propagation of a single-mode signal, and the wavelength $\lambda_1$ of the second source may be such that optical energy from the second source initiates in the optical transmission means the propagation of a few-mode signal. The system is so designed that the second source can be an inexpensive light emitting diode such as a gallium-arsenide device.

In one embodiment of the invention the bidirectional optical transmission means is an optical fiber comprising a core of transparent material having a maximum refractive index $n_1$ and a radius a, and a layer of transparent cladding material on the outer surface of said core, the refractive index $n_0$ of said cladding being less than $n_1$. The fiber is characterized in that the refractive indices $n_1$ and $n_0$, the radius a, and the refractive index profile of the core are designed such that (a) $\Delta \tau_j$, the difference between $|d(Vb)/dV|_j$, the normalized delay time of the jth mode of said few-mode optical signal and $|d(Vb)/dV|_0$, the normalized delay time of the fundamental mode of said few-mode optical signal, is less than about $5 \times 10^{-2}$ over a wide range of V-values where j is equal to 1 or 2 and represents the highest order mode that propagate with a low loss, 0 represents the fundamental mode, b is the propagation constant and V is the normalized frequency, and (b) the normalized waveguide dispersion $Vd^2(Vb)/dV^2$ of said optical fiber at wavelength $\lambda_2$ is about equal to or less than 0.2 at V-values near $V_c^1$, the normalized cutoff frequency of the first highest order mode.

Thus, the system of the present invention exhibits bandwidths greater than 1 GHz-km in both directions, and the dispersion can be less than 5 ps/nm-km in the high data rate direction.

DETAILED DESCRIPTION

Figure 1:
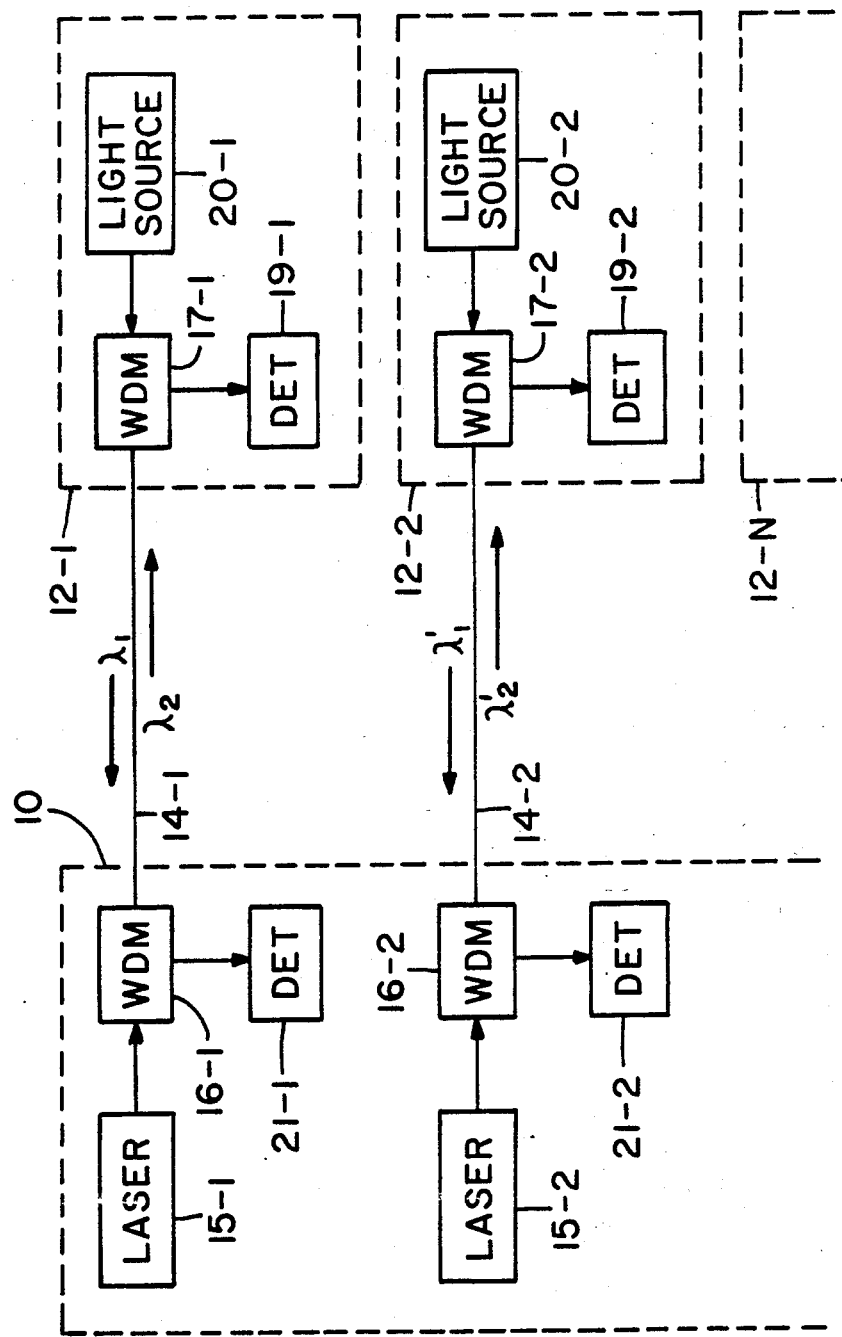
FIG. 1 is a schematic illustration of an optical transmission network for connecting a central station with a plurality of user stations in accordance with an illustrative embodiment of the present invention.

The optical transmission network of FIG. 1 comprises a central station 10 and a plurality of user stations 12-1 through 12-N, of which only 12-1 and 12-2 are shown in detail. The suffix "-N" is used herein to indicate that any number of user stations may be present. The central station could be a telephone local exchange office or remote terminal, a cable television head end or a remote distribution station, a computer or a cluster of computers with associated controllers, a weapons control center or any other network or system site originating information for the system. Information is transmitted from central station 10 to user stations 12-1, 12-2, . . . 12-N and from user stations 12-1, 12-2, . . . 12-N to central station 10 by means of low loss optical fibers 14-1, 14-2, . . . 14-N, respectively, each fiber forming a bidirectional optical link. Each of the fibers 14-1, 14-2, . . . 14-N bidirectionally transmits optical signals at two wavelengths of radiation, $\lambda_1$ and $\lambda_2$. The signal propagation wavelengths of the various optical links may be the same or different. Thus, optical fibers 14-1 and 14-2 are shown as propagating wavelengths $\lambda_1$ and $\lambda_1^1$, respectively, in the low data rate direction and wavelengths $\lambda_2$ and $\lambda_2^1$, respectively, in the high data rate direction. For purposes of the present discussion, it will be assumed that the wavelengths $\lambda_1$ and $\lambda_1^{\ 1}$ are equal and that wavelengths $\lambda_2$ and $\lambda_2^1$ are equal. A particularly suitable optical fiber for use in the system of FIG. 1 is that taught in said related patent application Ser. No. 197,594 (V. A. Bhagavatula 9A), which will be discussed in greater detail below.

The wavelength $\lambda_2$ radiation is produced in the central office 10 by means of the sources 15-1, 15-2, . . . 15-N, each of which may comprise a laser diode, LED or the like. The wavelength $\lambda_1$ radiation is produced in the local stations 12-1, 12-2, . . . 12-N by means of laser diodes, LED's or the like, depending upon the particular system.

At each end of of the optical fibers 14-1, 14-2, . . . 14-N there is a bidirectional WDM device which may consist of a dichroic beam splitter, a wavelength selective fiber coupler, or the like. Bidirectional WDM devices 16-1, 16-2, . . . 16-N are located in central station 10. Similarly, WDM devices 17-1, 17-2, . . . 17-N are located in the user stations 12-1, 12-2, . . . 12-N, respectively. The WDM devices permit the fibers 14-1, 14-2, . . . 14-N to simultaneously transmit the wavelength $\lambda_1$ and wavelength $\lambda_2$ in opposite directions. Such WDM devices are discussed in OFC'83 conference PO#1 and in U.S. Pat. No. 4,705,350.

Instead of employing a separate laser in central station 10 for each user station, a single laser can be used to transmit information to a plurality of user stations as taught in U.S. Pat. No. 4,705,350. In such a modification, a laser is connected to a plurality of modulators by a power divider. The modulator outputs are then coupled to the central station WDM devices.

At the user stations 12-1, 12-2, . . . 12-N the WDM devices demultiplex the incoming wavelength $\lambda_2$ radiation from the outgoing $\lambda_1$ radiation. The wavelength $\lambda_2$ radiation is then detected by the detectors 19-1, 19-2, . . . 19-N. In order to transmit information from any one of the user stations 12-1, 12-2, . . . 12-N to central station 10, the optical signal from the respective one of the light sources 20-1, 20-2, . . . 20-N is multiplexed with the oppositely directed wavelength $\lambda_2$ radiation by the respective one of the WDM devices 17-1, 17-2, . . . 17-N. At the central station 10, wavelength $\lambda_1$ radiation transmitted by the respective one of the fibers 14-1, 14-2, . . . 14-N is demultiplexed by the respective one of the WDM devices 16-1, 16-2, . . . 16-N and is detected by the respective detector 21-1, 21-2, . . . 21-N.

Conventional single-mode fibers are capable of propagating high data rate signals produced by lasers 15-1, 15-2, . . . 15-N, preferably in the 1100–1700 nm window where dispersion is lowest in silica based fibers. However, it has heretofore not been possible to utilize inexpensive sources capable of operating in the 700–950 nm region to transmit high data rate signals back to the central station over silica-based fibers. By "high data rate signals" is meant those requiring a minimum bandwidth of about 1 GHz-km.

Examples of suitable fibers are those disclosed in said Bhagavatula patent application Ser. No. 094,504, which is incorporated herein by reference. To facilitate the description of the physical and propagation characteristics of that fiber, the following art recognized terms are defined. These terms are well known in the art and can be found in such texts and publications as *Optical Fiber Telecommunications*, edited by S. E. Miller et al., Academic Press, 1979 (especially Chapter 3); *Optical Fibers for Transmission* by J. E. Midwinter, John Wiley & Sons, 1979 (especially Chapters 5 and 6); *Theory of Dielectric Waveguides* by D. Marcuse, Academic Press, 1974; and U.S. Pat. No. 4,715,679 (Bhagavatula).

In optical fibers utilized for communication purposes, the relative refractive index difference $\Delta$ is much less than 1, the term $\Delta$ being defined as $$\Delta = \frac{n_1^2 - n_0^2}{2n_1^2} \approx \frac{n_1 - n_0}{n_1} \tag{2}$$

Fibers having such small values of $\Delta$ are called weakly guiding fibers; the propagation constants of their guided modes are represented by $\beta$ such that $$n_0 k < \beta < n_1 k \tag{3}$$

where $n_1$ is the peak refractive index of the core, $n_0$ is the cladding index and k, the propagation constant of plane waves in vacuum, is equal to $2\pi/\lambda$, $\lambda$ being the wavelength.

The normalized frequency V is a dimensionless number that determines the number of modes a fiber can support; it can be defined as follows:

$$V = (n_1^2 - n_0^2)^{\frac{1}{2}} ka \quad (4)$$

where a is the core radius. The term $V_c^j$ is the normalized cutoff frequency of the jth mode, the term $V_c^1$ being the normalized cutoff frequency of the first higher order mode. The operating V-value is $V_o$.

A more convenient way of representing the propagation constant is by the normalized propagation constant b, which is defined as $$b = \frac{(\beta/k)^2 - n_0^2}{n_1^2 - n_0^2} \quad (5)$$

The normalized propagation constant b depends on the refractive index profile of the fiber and the normalized frequency V. An example of such behavior is shown for step index fibers in FIG. 3.3 of the publication *Optical Fiber Telecommunications*. In general, for more complicated refractive index profiles, such propagation curves of b vs. V are obtained by numerical calculations by computer modeling.

When more than one mode propagates in an optical fiber, the difference in delay times of the fastest and slowest propagating modes limits the bandwidth of the fiber. The normalized delay time of the jth mode is given by $|d(Vb)/dV|_j$, where j represents the highest order mode that propagates with low loss and 0 represents the fundamental mode. The difference between the normalized delay times of the fundamental mode and the jth mode can be characterized by $$\Delta \tau_j = \left| \frac{d(Vb)}{dV} \right|_j - \left| \frac{d(Vb)}{dV} \right|_0, \quad (6)$$

In single-mode waveguides the total dispersion is governed by the material dispersion $D_m$ and the waveguide dispersion $D_w$. For a given fiber composition, the material dispersion varies as a function of wavelength. For example, the material dispersion versus wavelength curve passes through zero dispersion at a wavelength near 1280 nm for high silica content fibers. Single mode fibers can be designed which exhibit zero total dispersion at any wavelength in a range of wavelengths above that wavelength at which the material dispersion curve passes through zero dispersion. This can be achieved by balancing out material dispersion with waveguide dispersion at some specified wavelength which is selected because of low fiber attenuation and/or availability of light sources. A convenient quantity for analyzing the waveguide dispersion is $Vd^2(Vb)/dV^2$, the normalized waveguide dispersion, which is related to waveguide dispersion $D_w$ as follows:

$$D_w \approx \frac{-n_0}{c} - \left| \frac{Vd^2(Vb)}{dV^2} \right| \quad (7)$$

where c is the speed of light. A graph of normalized waveguide dispersion versus the ratio $(V/V_c^1)$ enables one to compare the relative waveguide dispersions that can be obtained for different fiber core refractive index profiles.

In accordance with the teachings of said related application, an optical fiber will exhibit mode equalized few-mode operation and will also be capable of providing low dispersion single-mode operation at V-values near $V_c^1$, the normalized cutoff frequency of the first higher order mode, if the following conditions are met:

(a) The normalized propagation velocity of the fundamental mode and the jth mode must be sufficiently close over a wide range of operating wavelengths. The difference in the normalized delay times, $\Delta \tau_j$, between the fundamental mode and the jth mode must be less than about $5 \times 10^{-2}$ over a wide range of V-values where j is at least 1 and is preferably 1 or 2. In a preferred embodiment, the range of V-values over which $\Delta \tau_j$ is less than about $5 \times 10^{-2}$ is approximately 10% V near $V \sim V_c^{j+1}$ where $V_c^{j+1}$ represents the normalized cutoff frequency of the (j+1) mode. The multimode bandwidth of such a fiber can exceed 1 GHz-km, fibers designed in accordance with that patent exhibiting a multimode bandwidth of more than 2 GHz-km.

(b) The normalized waveguide dispersion $Vd^2(Vb)/dV^2$ is about equal to or is less than 0.2 at V-values near $V_c$. This requirement ensures low total dispersion, i.e. less than 5 ps/km-nm, in the single-mode region near $V_c^1$.

Fibers designed in accordance with the teachings of said related application will generally propagate only one low-loss higher order mode. However, since fibers can be designed to provide mode equalized three mode operation wherein the second higher order mode is also characterized by low loss propagation, the term "few mode propagation" refers to the low loss propagation of the fundamental mode and at least one higher order mode. The highest order mode that propagates with low loss is designated the jth-mode.

Examples of some of the various kinds of fibers having a sufficient number of variables to meet both of the aforementioned conditions (a) and (b) are W-type fibers and segmented core fibers. The term "W-type fibers" as used herein means those fibers in which the central core region is surrounded by an index depression of sufficiently narrow width that a significant amount of power propagates beyond the depression at certain operating wavelengths.

Figure 2:
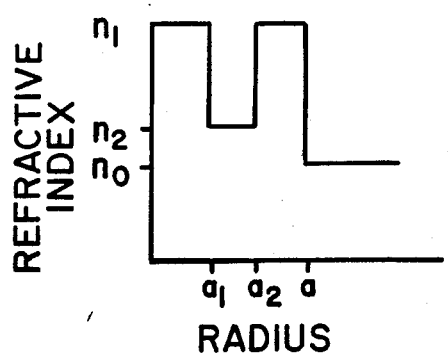
FIG. 2 is a preferred refractive index profile for optical fibers to be employed in the system of FIG. 1 that meet the requirements of the present invention.

A specific example of a segmented core refractive index profile having many design variables is shown in FIG. 2, wherein the core radius a, the inner and outer index depression radii $a_1$ and $a_2$, the core index values $n_1$ and $n_2$ and the cladding index $n_0$ can all be manipulated to optimize fiber parameters, thereby enabling the fiber to be operated at wavelengths in the 1100–1700 window wherein the fiber is single-mode and at wavelengths int he 700–900 nm window wherein the fiber is few-moded.

Figure 3:
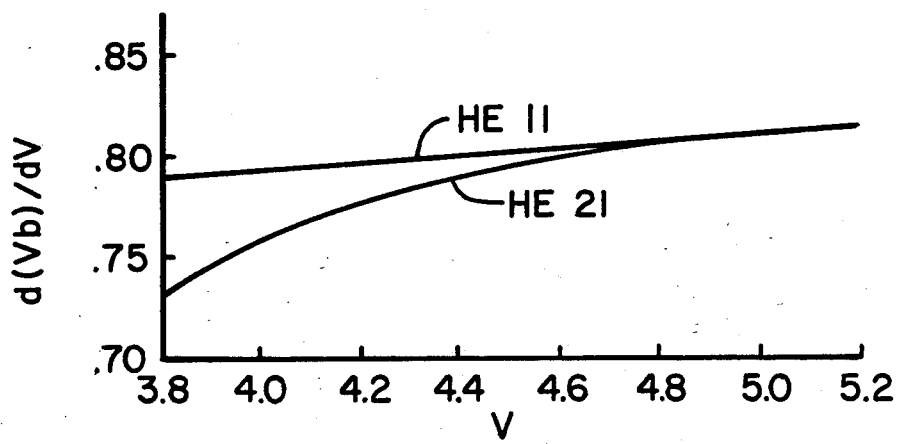
FIGS. 3 and 4 are graphs of d(Vd)/dV, the normalized pulse arrival time plotted as a function of V-values for two different fibers.
Figure 4:
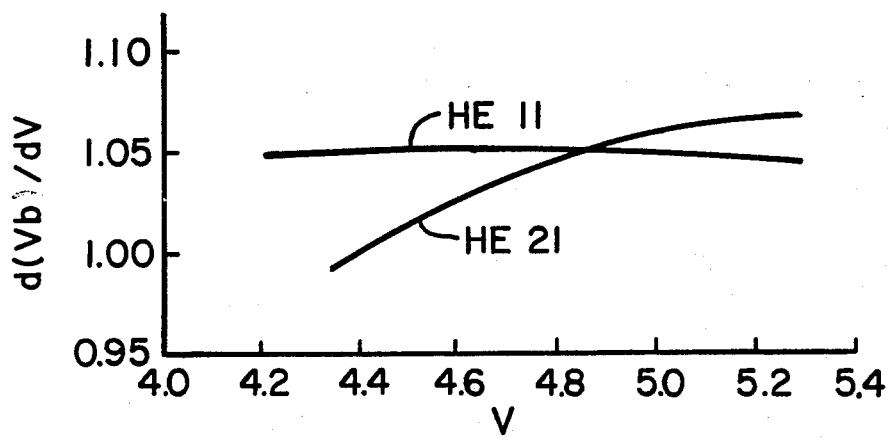

Specific values for the above-mentioned variables of FIG. 2 are obtained by an iterative process. One variable is changed in a given direction, and the mode equalization and single-mode dispersion characteristics are calculated. The variable is repeatedly changed in a direction such that these operating characteristics are improved. Then other variable are similarly varied to improve operating characteristics. The results of one such iterative process are as follows, reference being made to FIG. 2. The fiber radius a was determined to be about 5 $\mu$m while radii $a_1$ and $a_2$ were determined to be about 1.9 $\mu$m and about 3.5 $\mu$m, respectively. The relative refractive index difference $\Delta_1$, which is equal to $(n_1^2 - n_0^2)/2n_1^2$, was determined to be 0.45%, and $\Delta_2$, which is equal to $(n_2^2-n_0^2)/2n_1^2$, was determined to be 0.12%. FIG. 3 is a plot of $d(Vb)/dV$, the calculated normalized pulse arrival time, for the lowest order mode and the first higher order mode which propagate in the fiber described. For comparison purposes, FIG. 4 shows a similar graph for a fiber of the type characterized by equation (1) wherein the $\alpha$ value is 3. As compared with the curves of FIG. 3, the curves of FIG. 3 demonstrate a smaller change in the normalized pulse arrival times for the two propagating modes per unit change in V-value.

Figure 5:
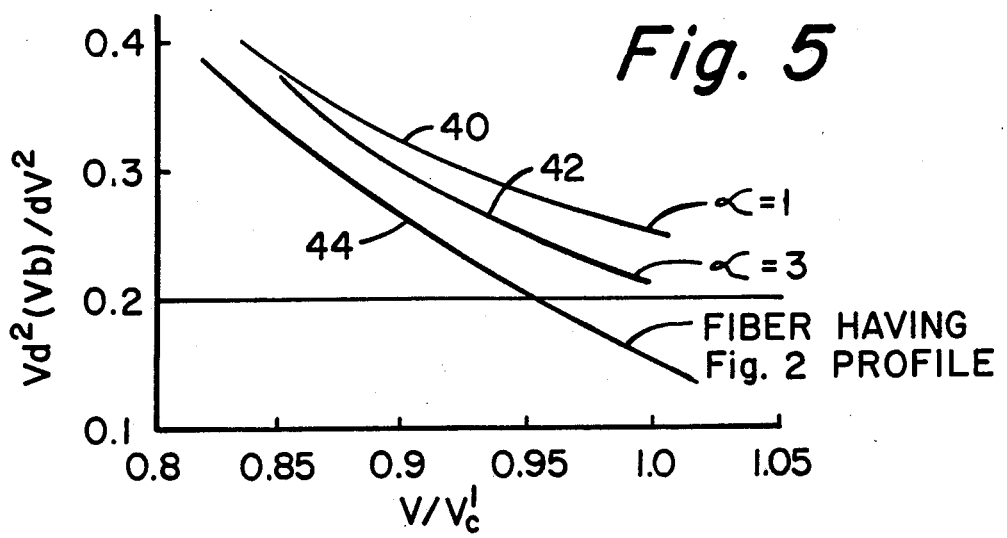
FIG. 5 is a graph of normalized waveguide dispersion plotted as a function of $V/V_c^1$.

The calculated single-mode propagating characteristics of the fibers characterized by the curves of FIGS. 3 and 4 are illustrated in FIG. 5 wherein the normalized waveguide dispersion $Vd^2(Vb)/dV^2$ is plotted as a function of the ratio $V/V_c^1$. The graph of FIG. 5 enables one to compare the relative waveguide dispersions that can be obtained for the three different fiber core refractive index profiles. Curve 44 has normalized dispersion of less than 0.2 at a value of $V/V_c^1$ close to but less than 1. This is indicative of the fact that a fiber having such characteristics could be advantageously operated at a wavelength which is at or just above the zero material dispersion wavelength, said operating wavelength being near the single-mode cutoff wavelength.

As heretofore noted, the difference in the calculated normalized pulse arrival times of the two modes characterized by FIG. 3 changes less with a change in V-value than the corresponding change of the $\alpha=3$ fiber characterized by FIG. 4. It was also mentioned above that the change in normalized pulse arrival time with respect to $\Delta V$ for an $\alpha$-profile fiber could be minimized by employing an $\alpha$-value smaller than 3. However, as shown in FIG. 5, the value of $Vd^2(Vb)/dV^2$ versus $V/V_c^1$ at $V=V_c^1$ increases as $\alpha$ decreases to values below 3. It is thus seen that, unlike the optical fiber of said related application, simple $\alpha$-profile fibers characterized by equation (1) cannot simultaneously provide mode equalized two mode and low dispersion single-mode operation.

Figure 6:
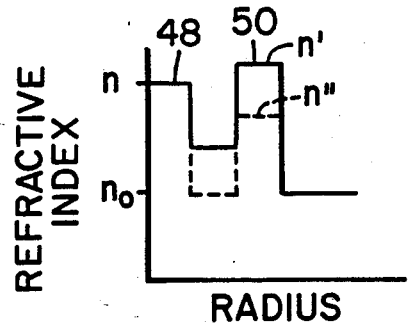
FIGS. 6 through 11 show the refractive index profiles of other suitable optical fibers.
Figure 7:
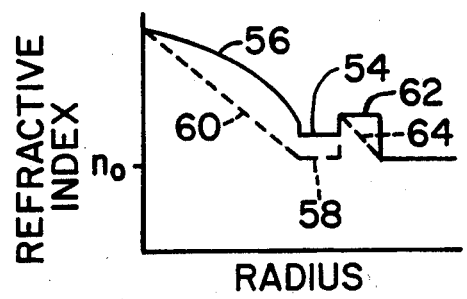

Fibers having core refractive index profiles of the types shown in FIGS. 6 through 12 should also be capable of satisfying the above-defined conditions (a) and (b) and thus provide both mode equalized few-mode propagation and low dispersion single-mode operation. In the refractive index profiles of FIGS. 6 and 7 the refractive indices of the core regions are limited to values that are equal to or greater than that of the cladding. In the profile of FIG. 6, the refractive index of inner core region 48 is $n_1$. Unlike the profile of FIG. 2, the refractive index of outer core region 50 can be $n_1'$ which is greater than $n_1$, or $n_1''$ which is less than $n_1$. FIG. 7 shows that the refractive index profiles of one or more of the core regions can be graded. The refractive index of depression 54 is lower than the lowest value of refractive index of inner core region 56. Dashed lines 58 and 60 indicate that the refractive index of depressed index region 58 can be the same as the lowest value of refractive index of inner region 60. The refractive index of the outer core region can be constant as indicated by line 62 or radially graded as indicated by line 64.

Figure 8:
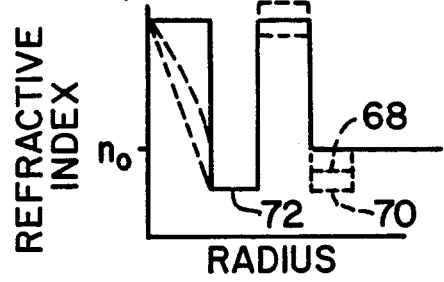

FIG. 8 shows that certain design variables can take on additional values by permitting the refractive index of one or more of the core regions to be lower than that of the cladding. This can be achieved, for example, by employing $SiO_2$ as the outer cladding material and F-doped or $B_2O_3$-doped $SiO_2$ as the low index core regions. Dashed lines 68 and 70 indicate that one or more additional core segments can be employed.

Figure 9:
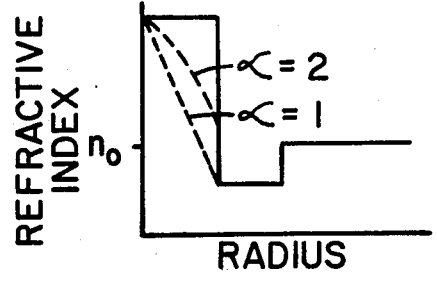
Figure 10:
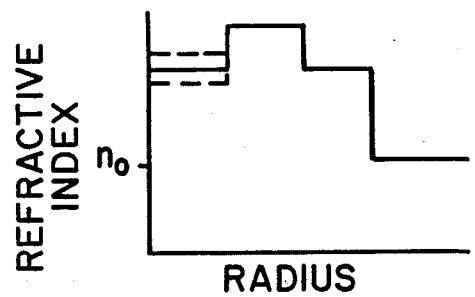
Figure 11:
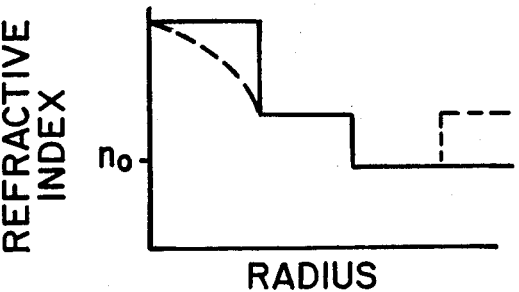

Other suitable profiles are shown in FIGS. 9, 10 and 11, wherein variations are indicated by dashed lines. It is noted that profiles such as those of FIGS. 9 and 11 present the fiber designer with fewer design variables than the profile of FIG. 6, for example. However, preliminary calculations indicate that these profiles can provide suitable two-mode/single-mode operation. Fibers of the type represented by FIG. 8, wherein the refractive index of the depressed index region 72 is lower than that of the cladding, are likely to exhibit low bending loss characteristics.

It is noted that many of the core profiles of FIGS. 6 through 11 have been considered previously in connection with optical fibers which operate exclusively in either the single-mode or the multimode region. However, none have been considered previously in connection with optical fibers which are so characterized that they are capable of simultaneously providing mode equalized two-mode operation and low dispersion single-mode operation.

Optical fibers having core index profiles suitable for use in the system of the present invention can be fabricated by conventional fiber fabrication processes including, but not limited to: (a) the inside CVD process exemplified by the process disclosed in U.S. Pat. No. 4,217,027, (b) the plasma CVD process exemplified by the process disclosed in the Journal of the Electrochemical Society: Solid State Science and Technology, vol. 125, No. 8, Aug. 1978, pages 1298–1302, and (c) the outside CVD process, an embodiment of which is discussed below.

Silica is employed as the base material for most commercially available optical fibers. Such fibers exhibit low attenuation in the following wavelength regions: 700 nm to 930 nm, 1270 nm to 1335 nm and 1410 nm to 1600 nm, these low attenuation regions being separated by regions of high attenuation caused by OH ions. Since the material dispersion versus wavelength curve passes through zero dispersion at a wavelength near 1280 nm for high silica content fibers, single-mode fibers can be designed which exhibit zero total dispersion at any wavelength above that wavelength. Various design parameters of the fiber are adjusted so that the waveguide dispersion balances out the material dispersion at some specified wavelength which is usually selected because of low fiber attenuation and/or availability of light sources. Single-mode silica-based optical fibers which operate in the wavelength range between 1270 nm and 1335 nm are referred to as dispersion nonshifted fibers when they exhibit zero total dispersion in that low attenuation region that is occupied by the zero material dispersion wavelength but exhibit higher dispersion at longer wavelengths. Techniques such as those disclosed in U.S. Pat. No. 4,715,679 can be employed to make dispersion shifted fibers wherein the zero total dispersion wavelength is in the wavelength region above 1550 nm. That patent also describes a dispersion flattened fiber which exhibits low total dispersion over a wide band of wavelengths which includes the zero material dispersion wavelength. It is contemplated that the few mode/single-mode fiber of the present invention could be modified in accordance with the teachings of U.S. Pat. No. 4,715,679 such that the fiber would propagate a single-mode signal which exhibits (a) low total dispersion over a wide band of wavelengths which includes the zero material dispersion wavelength, or (b) (1) waveguide dispersion that is relatively uniform with respect to wavelength, and (b) (2) waveguide dispersion is relatively large at wavelengths greater than 1400 nm so that large values of material dispersion can be completely cancelled, whereby the fiber exhibits zero total dispersion at wavelengths greater than 1500 nm.

An optical fiber having a refractive index profile of the type illustrated in FIG. 2 was made as follows. In accordance with the above-described procedure, the fiber radii and refractive indices were determined. Radii a, $a_1$ and $a_2$ were determined to be about 5 μm, 1.9 μm and 3.5 μm, respectively. The relative refractive index differences $\Delta_1$ and $\Delta_2$ were determined to be about 0.45% and 0.12%, respectively. Pure $SiO_2$ was selected for the cladding material, and the core regions were formed of $SiO_2$ doped with $GeO_2$. In order to achieve the aforementioned $\Delta$ values, it was determined that the central core region of radius $a_1$ and the core segment between radii $a_2$ and a should consist of $SiO_2$ doped with about 9 wt. % $GeO_2$ and the segment of depressed refractive index between radii $a_1$ and $a_2$ should consist of $SiO_2$ doped with about 2.5 wt. % $GeO_2$ A particulate glass core preform was made by a process similar to those taught in U.S. Pat. Nos. 4,453,961 and 4,486,212, wherein flame a flame hydrolysis burner deposits glass particles on the surface of a cylindrically-shaped mandrel to form the core portion and the inner cladding region of the resultant fiber. The mandrel was removed from the particulate glass preform which was then dried, consolidated and stretched to reduce the diameter thereof. Additional $SiO_2$ was then deposited to form the remainder of the cladding. The resultant dense glass preform was drawn into a fiber. Because of diffusion which occurs during the drying, consolidating and drawing operations, the peaks and valleys of the refractive index profile of the fiber are rounded rather than step-shaped as shown in FIG. 2. Also, there is an index depression at the center line. The results of these diffusion processes manifest themselves to the greatest extent after the core preform has been consolidated. The refractive index profile of the core preform is therefore measured, and a step fitting equivalent to the measured profile is generated by computer to determine whether the preform refractive index profile sufficiently closely approximates the desired profile. If the effective refractive index value or radius of any region of the preform is not in accordance with the calculated specification, adjustments are made to various process parameters to bring the manufactured preform into closer agreement with the calculated specifications. The flow rates of the reactants flowing to the burner, the temperatures of the flame and deposited particles, and the process variables of the drying and consolidating processes are examples of conditions that can be changed to bring the equivalent step fitting of the next produced preform into closer conformity with the calculated specification.

A core preform was manufactured in accordance with the above-described process. The core and cladding diameters of the consolidated preform were 3.06 mm and 6.94 mm, respectively, and the ratios $a_{1j}/a$ and $a_2/a$ were 0.373 and 0.686, respectively. The values of $\Delta_1$ and $\Delta_2$ were 0.4516 and 0.1231, respectively. The preform was stretched to eliminate the axial hole and to reduce the diameter thereof. The stretched preform was overclad with additional $SiO_2$, and drawn into an optical fiber, hereinafter referred to as the FM/SM fiber.

Similarly formed fibers exhibited peak relative index differences ($\Delta_1$) as high as 0.55% and cutoff wavelengths between 1100 nm and 1400 nm.

Figure 12:
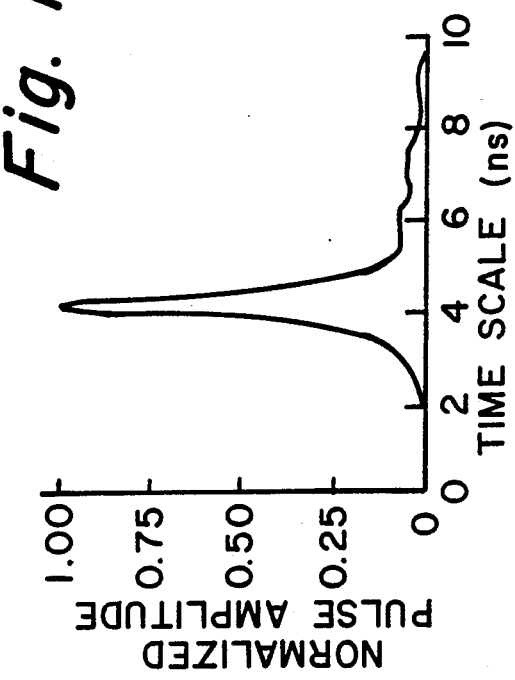
FIGS. 12 and 13 are graphs illustrating the frequency response characteristics and the pulse characteristics, respectively, of a fiber of the type utilized in the system of FIG. 1.
Figure 13:
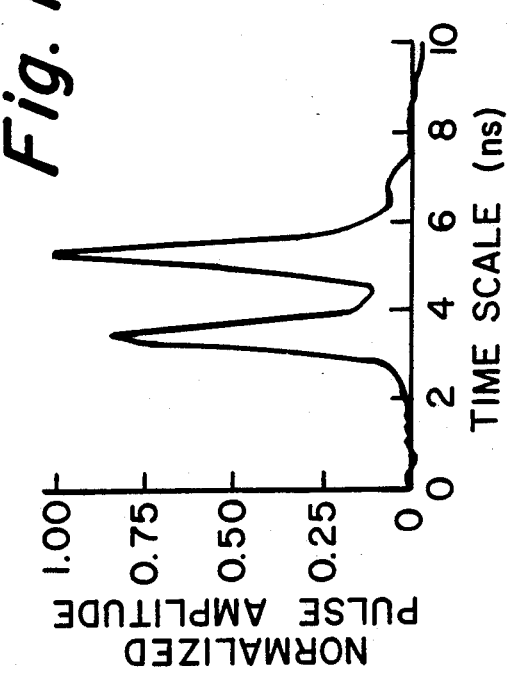

FM/SM fibers of the type produced in accordance with the above example are preferred for use in the system of FIG. 1 since they function as a high-bandwidth few-mode fibers at wavelengths in the 700-950 nm window, thereby enabling the use of inexpensive gallium arsenide devices for sources 20-1, 20-2, . . . 20-N. As shown in FIG. 12, the mode equalization achieved with this type of fiber design at 900 nm is such that the measured 3 dB bandwidth is greatly in excess of 2 GHz-km. Similar results were also achieved at 850 nm. The extrapolated 3 dB bandwidth is between 2 and 4 GHz km over a wavelength range of about 100 nm. The pulse characteristics of this mode-equalized FM/SM fiber are illustrated in FIG. 13 which shows that a single sharp pulse is received by the detector.

Figure 14:
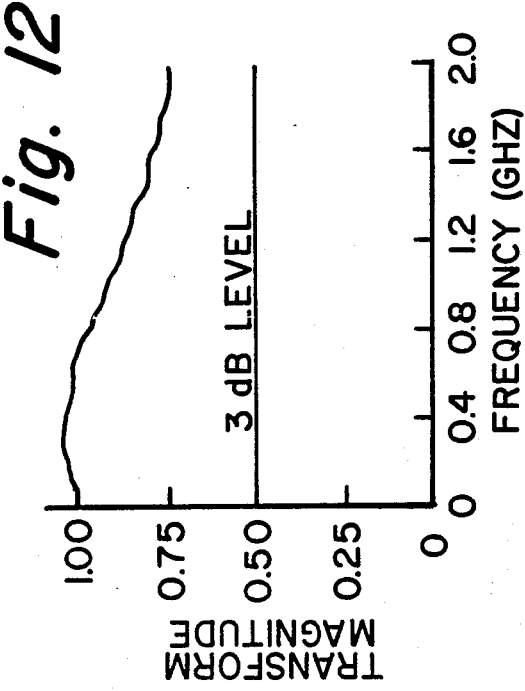
FIGS. 14 and 15 are graphs illustrating the frequency response characteristics and the pulse characteristics, respectively, of a conventional step-index single-mode optical fiber.
Figure 15:
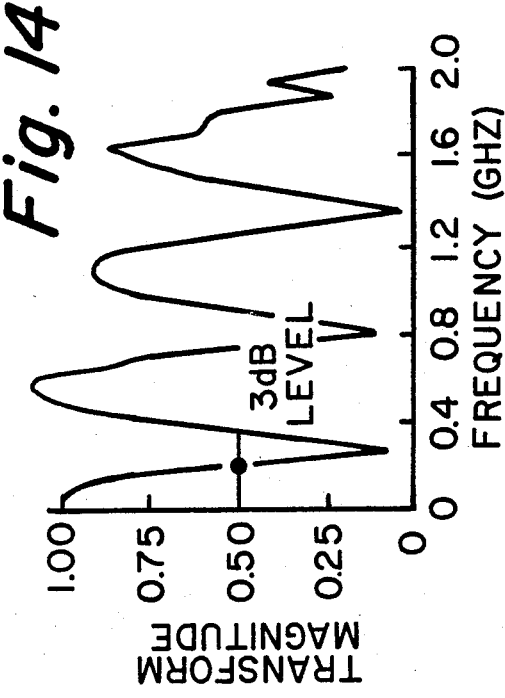

FIGS. 14 and 15 are included for comparison purposes. These graphs show the 3 dB bandwidth and pulse characteristics at 900 nm for a conventional single-mode fiber having a step-index profile. FIG. 14 shows that such conventional fibers have a 3 dB bandwidth of about 420 MHz-km. The modulation in the transform magnitude is due to the large separation in the delay times of the two modes supported in the step-index fiber at 900 nm. The pulse characteristics which are responsible for the prior frequency response characteristics of such conventional fiber are shown in FIG. 15, wherein two distinct output pulses are evident.

Due to the few-mode propagation in the $\lambda_1$ wavelength direction of FIG. 1, more power can be coupled into the FM/SM fiber from sources 20-1, 20-2, . . . 20-N. In the few moded region of operation of the fiber of the above example, more than twice the power could be coupled into the fiber from a given source as compared with the amount of light that could be coupled from that source to a fiber designed to be single-mode at that wavelength. It is also possible that more efficient splices can be obtained for the few-moded transmission at $\lambda_1$.

Lasers 15-1, 15-2, . . . 15-N of FIG. 1 can operate at any wavelength between 1280 nm and 1575 nm; the FM/SM fiber will operate as a high delta single-mode fiber at 1300 nm and 1500 nm while maintaining the zero dispersion wavelength in the 1300 nm-1320 nm window. The attenuation of the FM/SM fiber at 1300 nm and 1550 nm was about 0.35 dB/km and 0.20 dB/km, respectively. The zero dispersion wavelength was about 1312 nm. The mode field diameter, $2W_o$, was about 9.5 um. These 1300 nm dispersion and mode-field diameter performance characteristics are compatible with current dispersion nonshifted fibers. The bend performance was found to be comparable to existing commercial step-index single-mode fibers. Because these FM/SM fibers can be designed to give good bending performance in the single-mode region of operation, inexpensive cable structures may be employed.

We claim:

1. An asymmetrical bidirectional optical communication system comprising first and second stations, bidirectional optical transmission means for transmitting optical signals between said stations, a first source of radiation at said first station for propagating at a wavelength $\lambda_2$ through said optical transmission means an information-carrying optical signal with a total dispersion less than 5 ps/km-nm, and a second source of radiation at said second station for at a wavelength $\lambda_1$ through said optical transmission means a few-mode optical signal with a bandwidth greater than 1 GHz-km, said wavelength $\lambda_2$ being shorter than said wavelength.

2. An asymmetrical bidirectional optical communication system in accordance with claim 1 wherein the wavelength $\lambda_2$ of said first source is such that optical energy from said first source initiates in said optical transmission means the propagation of a single-mode signal.

3. An asymmetrical bidirectional optical communication system in accordance with claim 2 wherein the wavelength $\lambda_1$ of said second source is such that optical energy from said second source initiates in said optical transmission means the propagation of a few-mode signal.

4. An asymmetrical bidirectional optical communication system in accordance with claim 3 wherein said second source is a light emitting diode.

5. An asymmetrical bidirectional optical communication system in accordance with claim 3 wherein said light source is gallium-arsenide device.

6. An asymmetrical bidirectional optical communication system in accordance with claim 5 wherein said bidirectional optical transmission means is an optical fiber comprising a core of transparent material having a maximum refractive index $n_1$ and a radius a, and a layer of transparent cladding material on the outer surface of said core, the refractive index $n_0$ of said cladding being less than $n_1$, said fiber being characterized in that the refractive indices $n_1$ and $n_0$, the radius a, and the refractive index profile of the core are designed such that (a) $\Delta\tau_j$, the difference between $|d(Vb)/dV|_j$, the normalized delay time of the jth mode of said few-mode optical signal and $|d(Vb)/dV|_0$, the normalized delay time of the fundamental mode of said few-mode optical signal, is less than about $5 \times 10^{-2}$ over a range of V-values equal to about 10% of V near $Vc^{j+1}$, where j is an integer up to 2 and represents the highest order mode that is capable of propagating through said fiber, 0 represents the fundamental mode, b is the propagation constant and V is the normalized frequency and $Vc^{j+1}$ is the normalized cutoff frequency of the j+1 made, and (b) the normalized waveguide dispersion $Vd^2(Vb)/dV^2$ of said optical fiber at wavelength $\lambda_2$ is about equal to or less than 0.2 at V-values near $V_c^1$, the normalized cutoff frequency of the first higher order mode.

7. An asymmetrical bidirectional optical communication system in accordance with claim 1 wherein said bidirectional optical transmission means is an optical fiber comprising a core of transparent material having a maximum refractive index $n_1$ and a radius a, and a layer of transparent cladding material on the outer surface of said core, the refractive index $n_0$ of said cladding being less than $n_1$, said fiber being characterized in that the refractive indices $n_1$ and $n_0$, the radius a, and the refractive index profile of the core are designed such that (a) $\Delta\tau_j$, the difference between $|d(Vb)/dV|_j$, the normalized delay time of the jth mode of said few-mode optical signal and $|d(Vb)/dV|_0$, the normalized delay time of the fundamental mode of said few-mode optical signal, is less than about $5 \times 10^{-2}$ over a range of V-values equal to about 10% of V near $Vc^{j+1}$, where j is an integer up to 2 and represents the highest order mode that propagates through said fiber, 0 represents the fundamental mode, b is the propagation constant and V is the normalized frequency and $Vc^{j+1}$ is the normalized cutoff frequency of the J+1 mode, and (b) the normalized waveguide dispersion $Vd^2(Vb)/dV^2$ of said optical fiber at wavelength $\lambda_2$ is about equal to or less than 0.2 at V-values near $V_c^1$, the normalized cutoff frequency of the first higher order mode.

8. An asymmetrical bidirectional optical communication system comprising a plurality of user stations, each having a wavelength multiplexing device, a central station having a plurality of wavelength multiplexing devices equal in number to the number of said user stations, a plurality of bidirectional optical transmission paths, one of which connects one of the wavelength division multiplexing devices of said central station with the wavelength division multiplexing device at a respective one of said user stations, each of said optical transmission paths comprising an optical fiber, radiation source means connected to each of the wavelength division multiplexing devices at said central station for propagating through each of said optical transmission means to each of said user stations an information-carrying optical signal with a total dispersion less than 5 ps/km-nm, radiation source means connected to the wavelength division multiplexing device at each of said user stations for propagating through a respective one of said optical transmission means to said central station a few-mode optical signal with a bandwidth greater than 1 GHz-km, the wavelength generated by said user station radiation source means being shorter than the wavelength generated by said central station radiation source means, detector means connected to each of the wavelength division multiplexing devices at said central station for detecting radiation transmitted thereto from a respective one of said user stations over the bidirectional transmission path connected thereto, and detector means connected to the wavelength division multiplexing device at each of said user stations for detecting radiation transmitted thereto from said central station over the bidirectional transmission path connected thereto.

9. An asymmetrical bidirectional optical communication system in accordance with claim 8 wherein the wavelength of the optical energy produced by the radiation source means at each of said user stations is such that said optical energy initiates in the respective one of said optical transmission means the propagation of a few-mode signal.

10. An asymmetrical bidirectional optical communication system in accordance with claim 9 wherein the wavelength of the optical energy produced by the radiation source means at said central station is such that said optical energy initiates in said optical transmission means the propagation of a single-mode signal.

11. An asymmetrical bidirectional optical communication system in accordance with claim 10 wherein the radiation source means located at each of said user stations is a light emitting diode.

12. An asymmetrical bidirectional optical communication system in accordance with claim 10 wherein said radiation source means is a gallium-arsenide device.

13. An asymmetrical bidirectional optical communication system in accordance with claim 12 wherein said bidirectional optical transmission means is an optical fiber comprising a core of transparent material having a maximum refractive index $n_1$ and a radius a, and a layer of transparent cladding material on the outer surface of said core, the refractive index $n_0$ of said cladding being less than $n_1$, said fiber being characterized in that the refractive indices $n_1$ and $n_0$, the radius a, and the refractive index profile of the core are designed such that
   (a) $\Delta\tau_j$, the difference between $|d(Vb)/dV|_j$, the normalized delay time of the jth mode of said few-mode optical signal and $|d(Vb)/dV|_0$, the normalized delay time of the fundamental mode of said few-mode optical signal, is less than about $5 \times 10^{-2}$ over a range of V-values equal to about 10% of V near $Vc^{j+1}$, where j is equal to 1 or 2 and represents the highest order mode that is capable of propagating through said fiber, 0 represents the fundamental mode, b is the propagation constant and V is the normalized frequency and $Vc^{j+1}$ is the normalized cutoff frequency of the J+1 made, and
   (b) the normalized waveguide dispersion $Vd^2(Vb)/dV^2$ of said optical fiber at wavelength $\lambda_2$ is about equal to or less than 0.2 at V-values near $V_c^1$, the normalized cutoff frequency of the first higher order mode.

14. An asymmetrical bidirectional optical communication system in accordance with claim 8 wherein said bidirectional optical transmission means is an optical fiber comprising a core of transparent material having a maximum refractive index $n_1$ and a radius a, and a layer of transparent cladding material on the outer surface of said core, the refractive index $n_0$ of said cladding being less than $n_1$, said fiber being characterized in that the refractive indices $n1$ and $n0$, the radius a, and the refractive index profile of the core are designed such that
   (a) $\Delta\tau_j$, the difference between $|d(Vb)/dV|_j$, the normalized delay time of the jth mode of said few-mode optical signal and $|d(Vb)/dV|_0$, the normalized delay time of the fundamental mode of said few-mode optical signal, is less than about $5 \times 10^{-2}$ over a range of V-values equal to about 10% of V near $Vc^{j+1}$, where j is an integer up to 2 and represents the highest order mode that is capable of propagating through said fiber, 0 represents the fundamental mode, b is the propagation constant and V is the normalized frequency and $Vc^{j+1}$ is the normalized cutoff frequency of the J+1 made, and
   (b) the normalized waveguide dispersion $Vd^2(Vb)/dV^2$ of said optical fiber at wavelength $\lambda_2$ is about equal to or less than 0.2 at V-values near $V_c^1$, the normalized cutoff frequency of the first higher order mode.

* * * * *